US012424791B2

(12) United States Patent
Tsau

(10) Patent No.: US 12,424,791 B2
(45) Date of Patent: Sep. 23, 2025

(54) ELECTRICAL CONNECTOR AND CABLE ASSEMBLY

(71) Applicant: EZCONN CORPORATION, New Taipei (TW)

(72) Inventor: Chang-Jie Tsau, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 317 days.

(21) Appl. No.: 18/142,266

(22) Filed: May 2, 2023

(65) Prior Publication Data

US 2024/0305044 A1 Sep. 12, 2024

(30) Foreign Application Priority Data

Mar. 6, 2023 (TW) ................................ 112201906

(51) Int. Cl.
*H01R 13/631* (2006.01)
*H01R 13/42* (2006.01)

(52) U.S. Cl.
CPC ......... *H01R 13/6315* (2013.01); *H01R 13/42* (2013.01)

(58) Field of Classification Search
CPC ... H01R 13/42; H01R 13/746; H01R 13/6315
USPC ......................... 439/246, 248, 252, 583, 567
See application file for complete search history.

(56) References Cited

U.S. PATENT DOCUMENTS 5,167,520 A * 12/1992 Henry ................ H01R 13/6315 439/376
5,641,294 A * 6/1997 Beard .................. H01R 13/746 439/247
5,944,548 A * 8/1999 Saito ...................... H01R 24/52 439/675
6,224,407 B1 * 5/2001 Duquerroy ......... H01R 13/6315 439/188
6,409,550 B1 * 6/2002 Splichal ................. H01R 24/52 439/701
7,544,093 B2 * 6/2009 Soubh ................ H01R 13/6599 439/581
7,607,929 B1 * 10/2009 Nguyen ................. H01R 24/52 439/246
7,704,077 B1 * 4/2010 Morley .................. H01R 24/50 439/63
7,922,529 B1 * 4/2011 Meurer ............. H01R 13/2421 439/700
7,963,785 B2 * 6/2011 Arts ..................... H01R 13/748 439/248

(Continued)

FOREIGN PATENT DOCUMENTS

CN 111463630 A * 7/2020
CN 113690699 A * 11/2021 ......... H01R 13/6315

*Primary Examiner* — Marcus E Harcum
(74) *Attorney, Agent, or Firm* — Maschoff Brennan

(57) ABSTRACT

An electrical connector includes a base and a plurality of cable assemblies. The base has a plurality of installation through holes. The cable assemblies each includes a cable, a joint and an elastic component. The joint is connected to one end of the cable and located in one of the installation through holes. The elastic component is sleeved on the joint and clamped between a part of the joint and an inner surface of the one of the installation through holes. The joint is movable in the one of the installation through holes via an elasticity of the elastic component.

5 Claims, 6 Drawing Sheets

(56) References Cited

U.S. PATENT DOCUMENTS

| | | | | |
|---|---|---|---|---|
| 8,029,324 | B1 * | 10/2011 | Yi | H01R 13/518 439/745 |
| 8,794,111 | B2 * | 8/2014 | Wang | B25B 23/1427 81/475 |
| 9,490,570 | B1 * | 11/2016 | Hashiguchi | H01R 12/91 |
| 10,103,459 | B2 * | 10/2018 | Chen | H01R 24/38 |
| 10,439,302 | B2 * | 10/2019 | Youtsey | H01R 9/0527 |
| 11,075,491 | B2 * | 7/2021 | Hsu | H01R 13/506 |
| 11,990,715 | B2 * | 5/2024 | Manteiga | H01R 13/6315 |
| 2006/0051997 | A1 * | 3/2006 | Kooiman | H01R 9/0527 439/180 |
| 2013/0178081 | A1 * | 7/2013 | Wang | H01R 13/443 29/729 |
| 2021/0066853 | A1 * | 3/2021 | Miller | H01R 13/516 |
| 2021/0175672 | A1 * | 6/2021 | Hitchcock | H01R 24/76 |
| 2021/0376521 | A1 * | 12/2021 | Tie | H01R 13/6315 |

* cited by examiner

ELECTRICAL CONNECTOR AND CABLE ASSEMBLY

CROSS-REFERENCE TO RELATED APPLICATIONS

This non-provisional application claims priority under 35 U.S.C. § 119(a) on Patent Application No(s). 112201906 filed in Taiwan, R.O.C. on Mar. 6, 2023, the entire contents of which are hereby incorporated by reference.

TECHNICAL FIELD

The disclosure relates to an electrical connector and a cable assembly, more particularly to an electrical connector and a cable assembly including an elastic component.

BACKGROUND

Among various electrical connectors currently on the market, one of the electrical connectors has multiple joints. With one installation process, all the joints of the electrical connector can be respectively assembled with corresponding sockets, instead of assembling these joints to the corresponding sockets one by one.

However, in the production of this kind of the electrical connector, there are inevitably manufacturing deviations (errors), such that in the subsequent installation process, the centers of some of the joints may not be aligned with the centers of the corresponding sockets. Therefore, when the joints are assembled with the sockets, the terminals of some joints may collide with the terminals of the corresponding sockets, causing damage to the terminals, thereby adversely affecting the quality of the electrical connection between the joints and the sockets.

SUMMARY

The disclosure provides an electrical connector and a cable assembly, which are capable of reducing the risk of the damages to the terminals of the joints and the terminals of the sockets.

One embodiment of the disclosure provides an electrical connector. The electrical connector includes a base and a plurality of cable assemblies. The base has a plurality of installation through holes. The cable assemblies each includes a cable, a joint and an elastic component. The joint is connected to one end of the cable and located in one of the installation through holes. The elastic component is sleeved on the joint and clamped between a part of the joint and an inner surface of the one of the installation through holes. The joint is movable in the one of the installation through holes via an elasticity of the elastic component.

Another embodiment of the disclosure provides a cable assembly. The cable assembly is configured to be mounted into an installation through hole of a base. The cable assembly includes a cable, a joint and an elastic component. The joint is connected to one end of the cable and configured to be located in the installation through hole of the base. The elastic component is sleeved on the joint and configured to be clamped between a part of the joint and an inner surface of the installation through hole. The joint is movable in the installation through hole via an elasticity of the elastic component.

According to the electrical connector and the cable assembly as discussed above, the elastic component is sleeved on the joint and is clamped between a part of the joint and the inner surface of the installation through hole, such that during the installation of the joint on a socket, even if the central lines of the joint and the socket are not perfectly aligned with each other, the joint can sway in the installation through hole via the elasticity of the elastic component so as to be smoothly assembled with the socket. Therefore, the terminal of the joint and a terminal of the socket can be prevented from excessively colliding each other and from being damaged.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
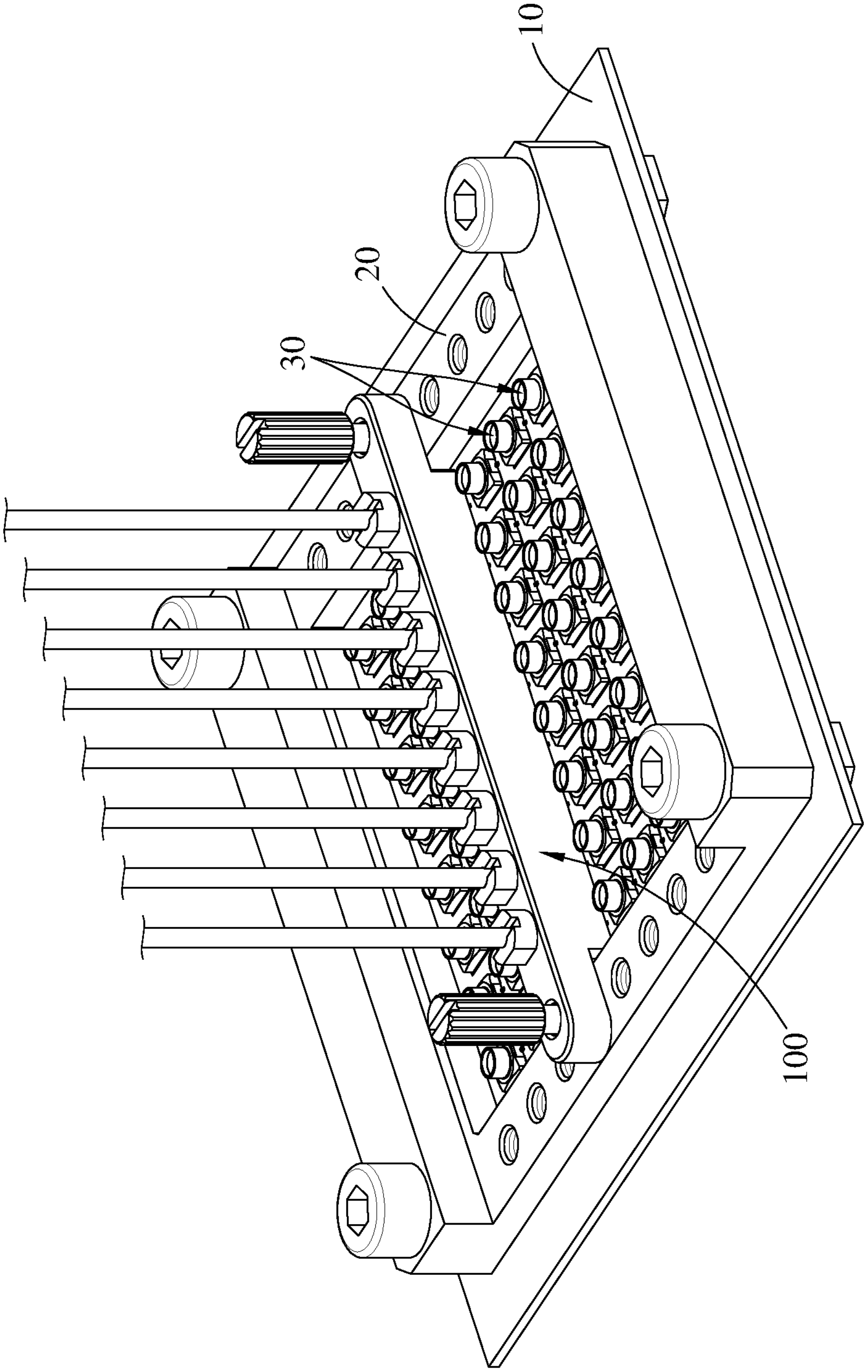
FIG. 1 is a perspective view of an electrical connector according to one embodiment of the disclosure, a circuit board and sockets.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
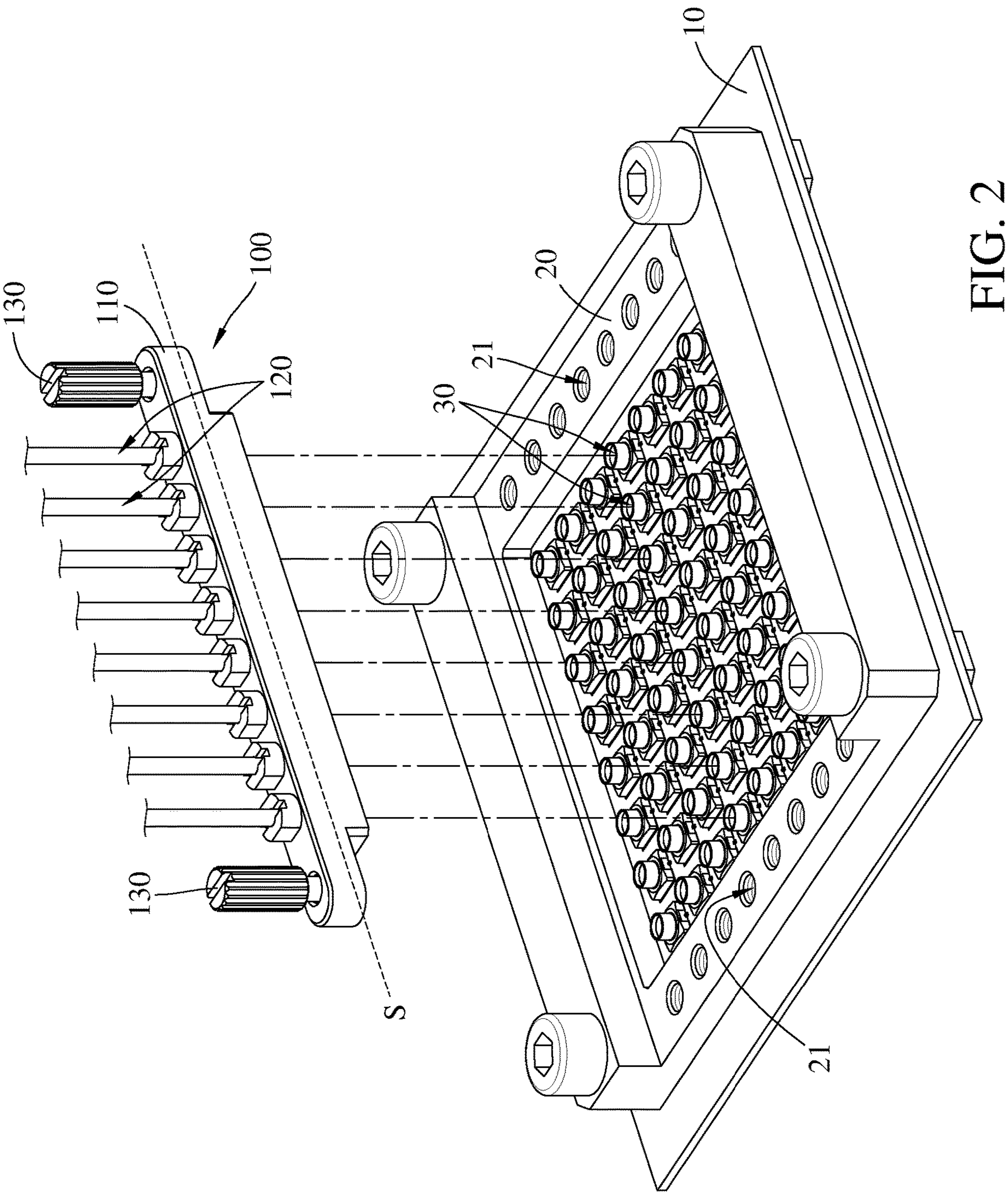
FIG. 2 is an exploded view of the electrical connector, the circuit board and the sockets in FIG. 1.

Referring to FIGS. 1 and 2, FIG. 1 is a perspective view of an electrical connector 100 according to one embodiment of the disclosure, a circuit board 10 and sockets 30, and FIG. 2 is an exploded view of the electrical connector 100, the circuit board 10 and the sockets 30 in FIG. 1.

In this embodiment, the electrical connector 100 is configured to be mounted on a seat 20 on the circuit board 10, and a plurality of joints 122 of the electrical connector 100 (shown in FIG. 3) are respectively configured to be assembled with the sockets 30 on the circuit board 10. The seat 20 is, for example, fixed on the circuit board 10 via screws. The sockets 30 are, for example, female joints, and the sockets 30 are disposed on the circuit board 10 and surrounded by the seat 20.

The electrical connector 100 includes a base 110 and a plurality of cable assemblies 120. In addition, the electrical connector 100 may include two screws 130.

The screws 130 are, for example, thumb screws. The screws 130 are disposed on two opposite sides of the base 110, and the screws 130 are respectively configured to be screwed into two screw holes 21 of the seat 20 located opposite to each other so as to fix the base 110 to the seat 20. Note that the screws 130 are optional components and may be omitted in some other embodiments. In such a case, the electrical connector may be fixed to the circuit board via fixation strengths between the joints thereof and the sockets.

Figure 3:
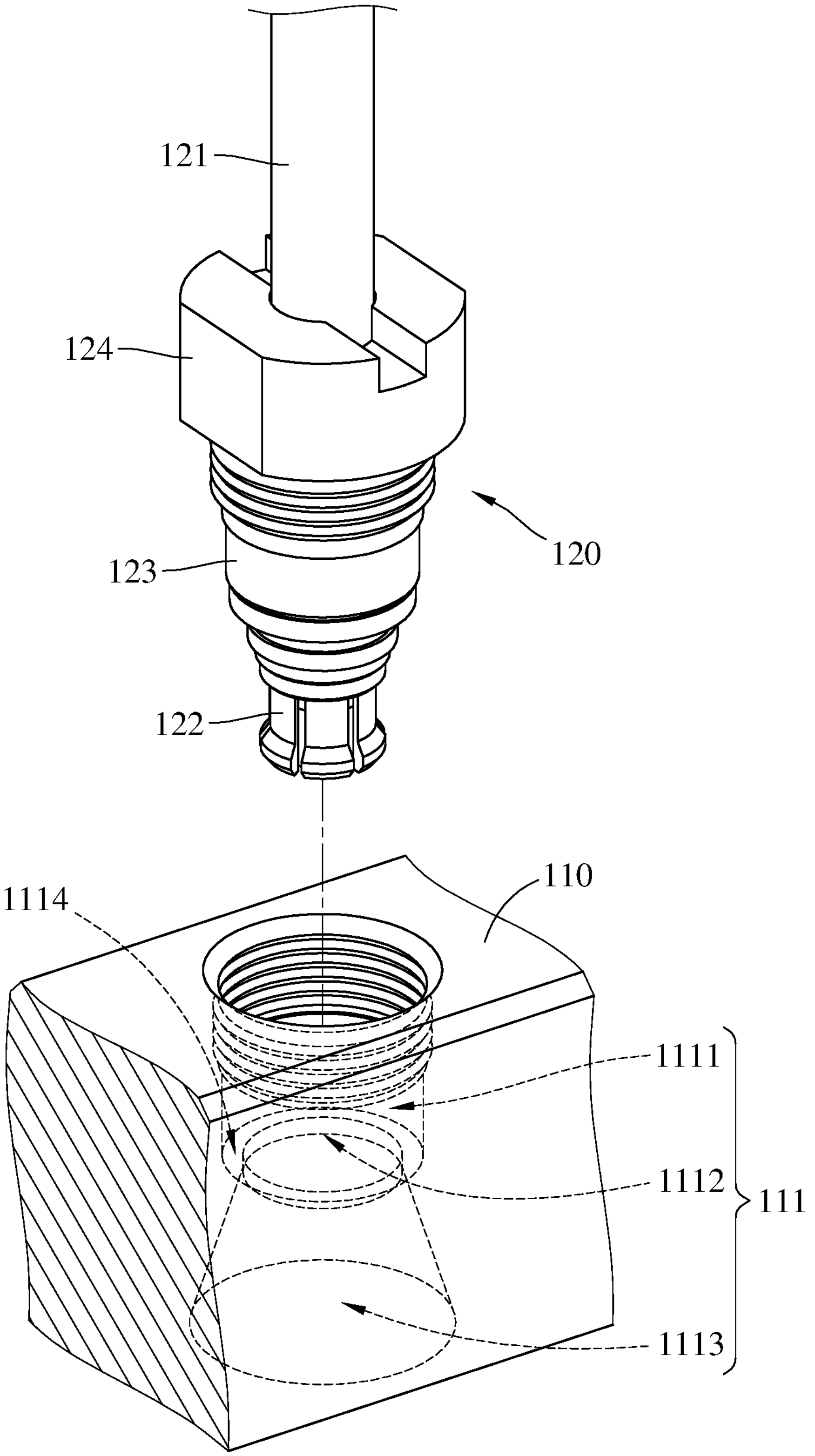
FIG. 3 is a partial exploded view of the electrical connector in FIG. 2.
Figure 4:
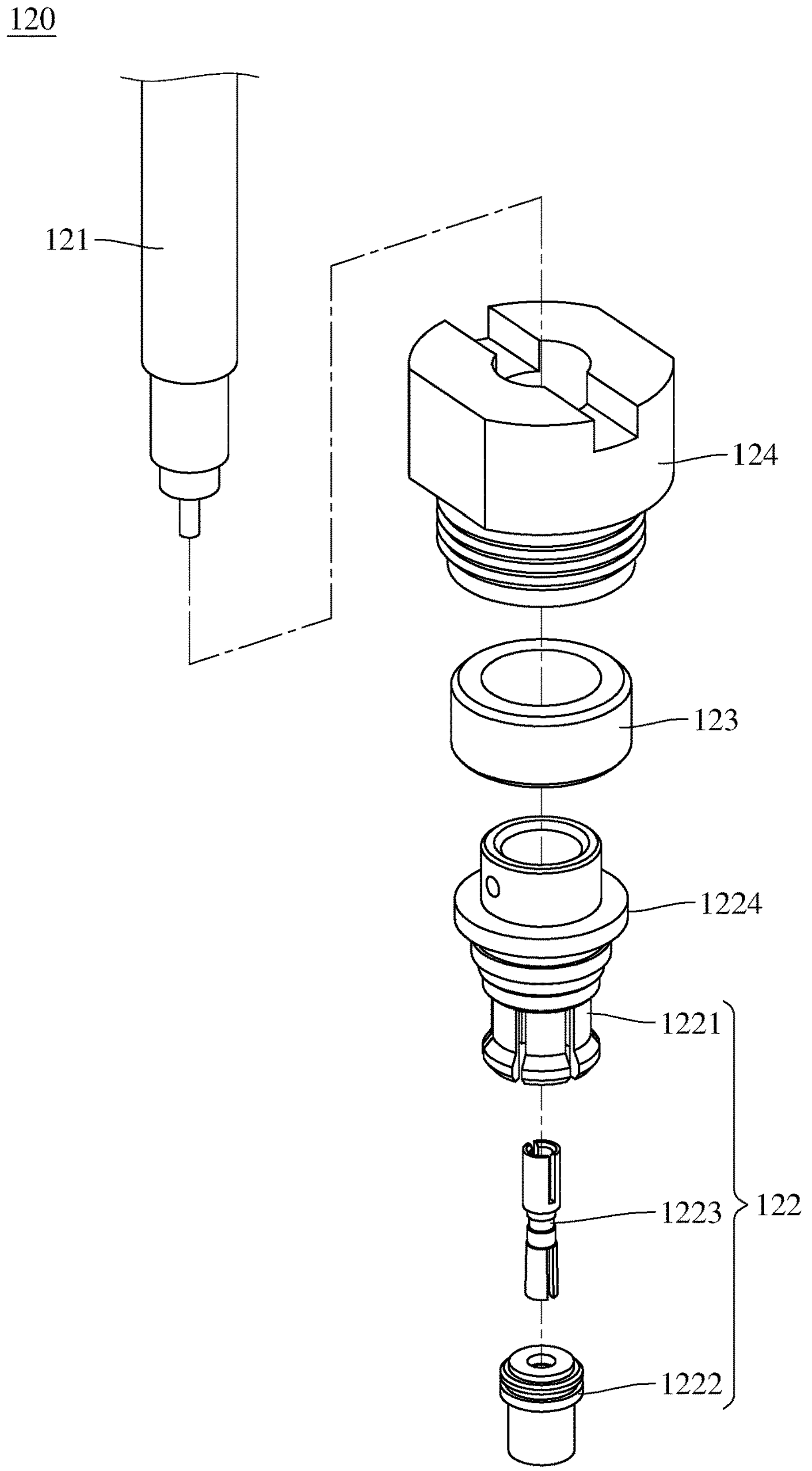
FIG. 4 is an exploded view of a cable assembly of the electrical connector in FIG. 3.
Figure 5:
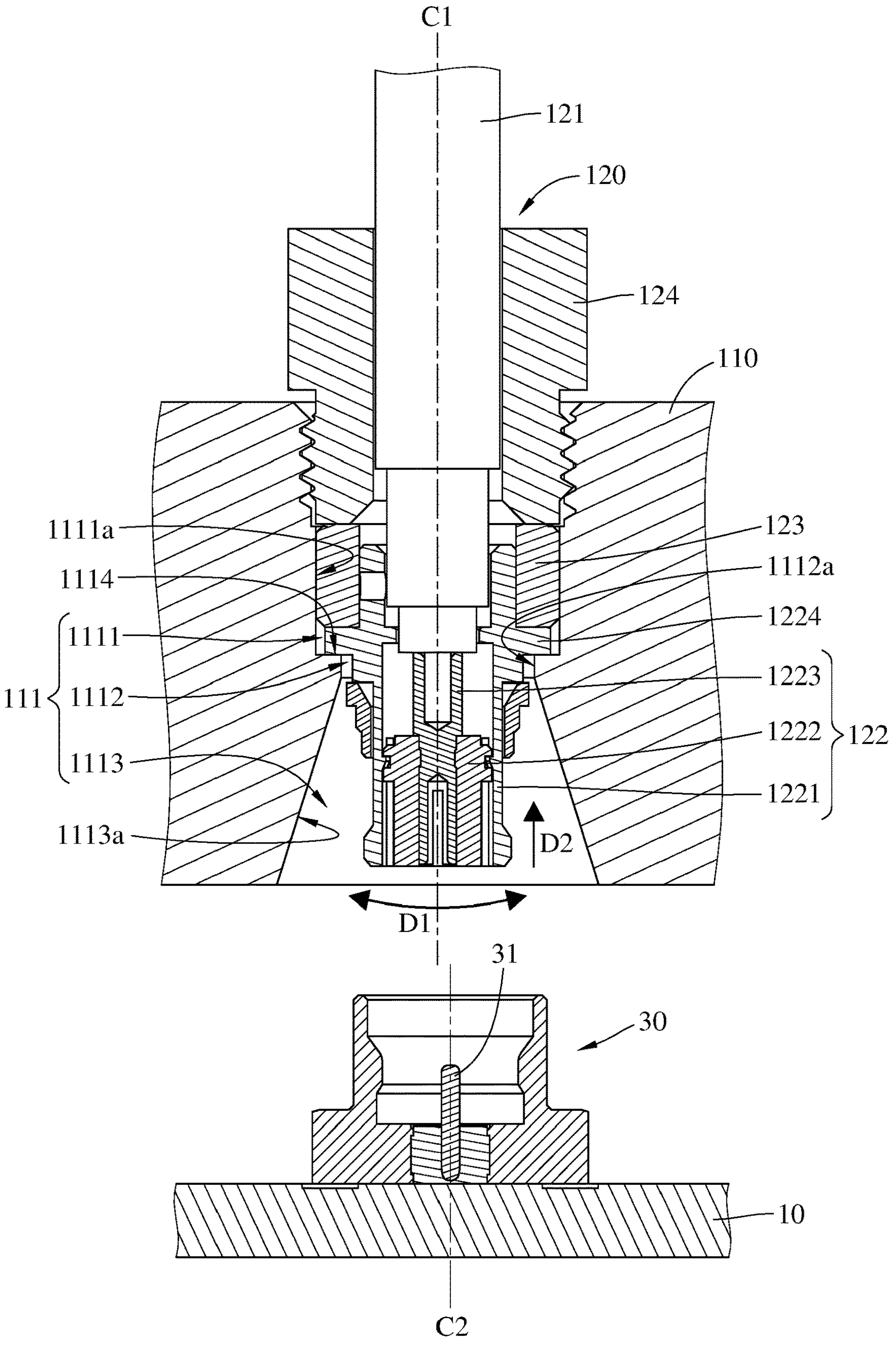
FIG. 5 is a partial cross-sectional view of the electrical connector, the circuit board and one socket in FIG. 2.

Then, referring to FIGS. 2 to 5, FIG. 3 is a partial exploded view of the electrical connector 100 in FIG. 2, FIG. 4 is an exploded view of the cable assembly 120 of the electrical connector 100 in FIG. 3, and FIG. 5 is a partial cross-sectional view of the electrical connector 100, the circuit board 10 and one socket 30 in FIG. 2.

The base 110 has a plurality of installation through holes 111, and the installation through holes 111 are, for example, arranged along a straight line S, but the disclosure is not limited thereto. The installation through holes 111 are the same in structure, and thus the following merely introduces one of them. The installation through hole 111 has a wide portion 1111, a narrow portion 1112 and a tapered portion 1113. A width of the wide portion 1111 is larger than a width of the narrow portion 1112, and a contact surface 1114 is formed between a place where the wide portion 1111 is connected to the narrow portion 1112. The tapered portion 1113 is connected to a side of the narrow portion 1112 located farther away from the wide portion 1111, and a width of the tapered portion 1113 gradually increases along a direction away from the narrow portion 1112. In this embodiment, the tapered portion 1113 of the installation through hole 111 of the base 110 can provide a guidance effect during the installation of the joint 122 of the electrical connector 100 on the socket 30. Note that the tapered portion of the installation through hole of the base is an optional structure and may be omitted in some other embodiments.

The cable assemblies 120 are the same in structure, and thus the following paragraph introduces one of them.

The cable assembly 120 includes a cable 121, a joint 122 and an elastic component 123. In addition, the cable assembly 120 may further include a fastener 124. The joint 122 is, for example, a male joint, and the joint 122 is configured to be assembled with the socket 30. The joint 122 includes a sleeve 1221, a terminal seat 1222 and a terminal 1223. The sleeve 1221 is mounted on one end of the cable 121 and extends from the wide portion 1111 of the installation through hole 111 to the tapered portion 1113. The sleeve 1221, for example, has a radial flange 1224, but the disclosure is not limited thereto. The radial flange 1224 is located in the wide portion 1111 of the installation through hole 111, and one side of the radial flange 1224 is in contact with the contact surface 1114. The sleeve 1221 is, for example, separated from inner surfaces 1111*a*, 1112*a* and 1113*a* of the wide portion 1111, the narrow portion 1112 and the tapered portion 1113 of the installation through hole 111 in a radial direction of the joint 122; that is, the sleeve 1221 is not in contact with the inner surfaces 1111*a*, 1112*a* and 1113*a* of the wide portion 1111, the narrow portion 1112 and the tapered portion 1113 in the radial direction of the joint 122, such that the sleeve 1221 is slightly movable in the installation through hole 111. The terminal seat 1222 is disposed in the sleeve 1221, and the terminal 1223 is disposed on the terminal seat 1222 and is electrically connected to the cable 121. The terminal 1223 is configured to be in electrical contact with a terminal 31 of the socket 30. The elastic component 123 is, for example, made of a soft material, such as rubber. The elastic component 123 is sleeved on the sleeve 1221 and clamped between the inner surface 1111*a* of the wide portion 1111 and a part of the sleeve 1221; that is, an inner side and an outer side of the elastic component 123 are respectively in contact with the sleeve 1221 and the inner surface 1111*a* of the wide portion 1111. The fastener 124 is sleeved on the cable 121, and the fastener 124 is mounted in the wide portion 1111 of the installation through hole 111 of the base 110 via, for example, threaded structures. The fastener 124 and the radial flange 1224 of the sleeve 1221 together clamp the elastic component 123.

In this embodiment, when an external force is applied on the joint 122, the elasticity of the elastic component 123 enables the joint 122 to press against the elastic component 123 so as to sway relative to the base 110 (e.g., along a direction D1) or move along an axial direction of the elastic component 123 (e.g., along a direction D2), which facilitates the installation of the joint 122 on the socket 30.

Figure 6:
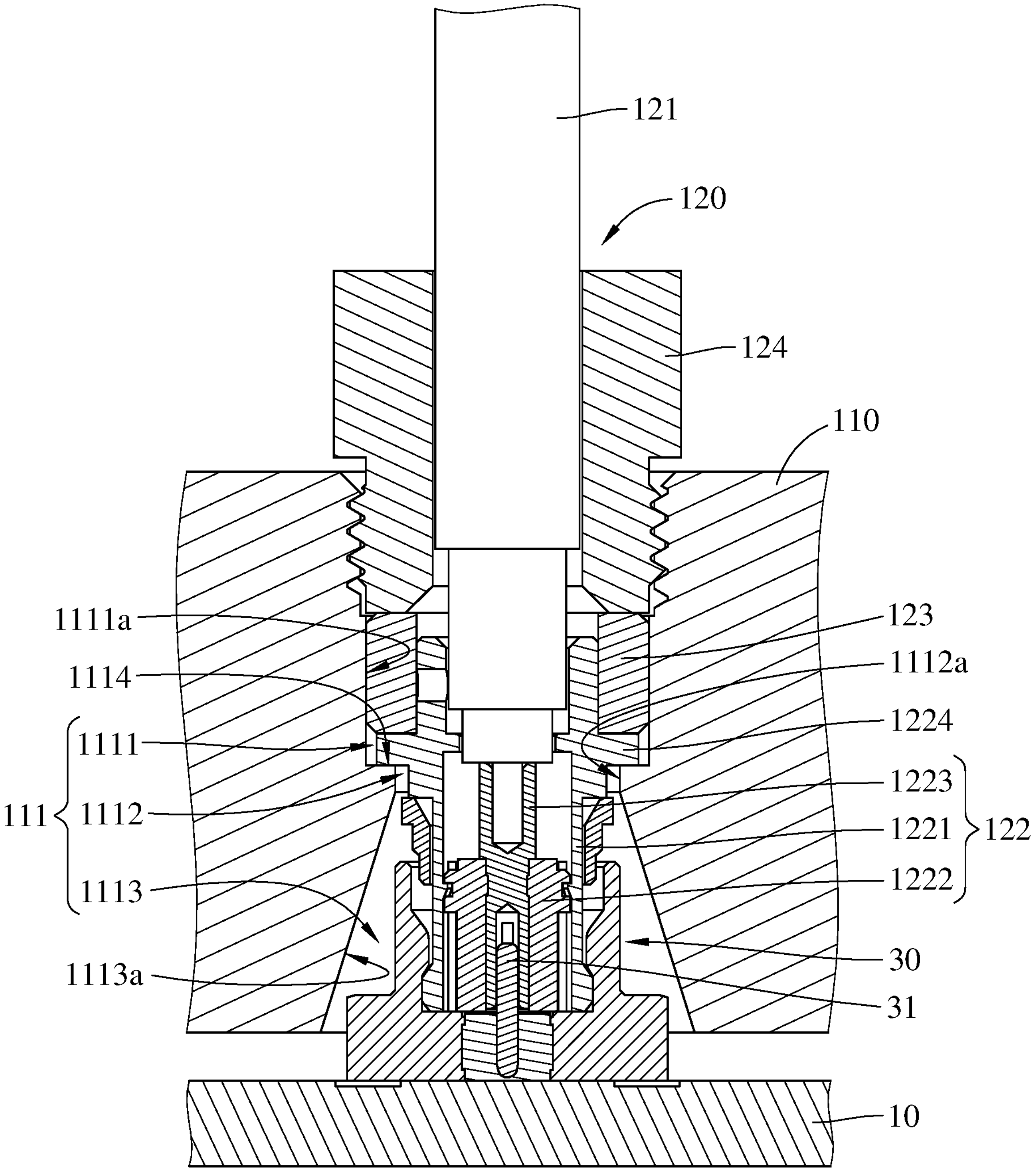
FIG. 6 is a partial cross-sectional view of the electrical connector in FIG. 5 when the electrical connector is assembled with the socket.

Specifically, when the joints 122 of the cable assemblies 120 are simultaneously assembled with the sockets 30, central lines of some of the joints 122 are unable to be aligned with central lines of the corresponding sockets 30 due to manufacturing deviations (errors) of production. For example, referring to FIGS. 5 and 6, FIG. 6 is a partial cross-sectional view of the electrical connector 100 in FIG. 5 when the electrical connector 100 is assembled with the socket 30. During the installation of the joint 122 on the corresponding socket 30, the central line C1 of the joint 122 is unable to be aligned with the central line C2 of the socket 30; that is, the terminal 1223 of the joint 122 and the terminal 31 of the socket 30 are offset from each other so as not to be aligned with each other. In this embodiment, the elastic component 123 is sleeved on the joint 122 and is clamped between a part of the joint 122 and the inner surface 1111*a* of the installation through hole 111, such that during the installation of the joint 122 on the socket 30, even if the central lines C1 and C2 of the joint 122 and the socket 30 are not perfectly aligned with each other, the joint 122 can sway in the installation through hole 111 via the elasticity of the elastic component 123 so as to be smoothly assembled with the socket 30. Therefore, the terminal 1223 of the joint 122 and the terminal 31 of the socket 30 can be prevented from excessively colliding each other and from being damaged.

In addition, the fastener 124 is fixed in the wide portion 1111 of the installation through hole 111 of the base 110, and the elastic component 123 is clamped between the radial flange 1224 of the sleeve 1221 of the joint 122 and the fastener 124, such that when the joint 122 having overly long length due to manufacturing deviations (errors) is assembled with the socket 30, the joint 122 can compress the elastic component 123 so as to move along the axial direction of the elastic component 123. Therefore, the terminal 1223 of the joint 122 and the terminal 31 of the socket 30 can be prevented from excessively colliding each other and from being damaged.

Note that the fastener 124 and the radial flange 1224 of the sleeve 1221 of the joint 122 are an optional component and an optional structure. When the length of the joint may not be too long, the fastener and the radial flange of the sleeve of the joint may be omitted. In such a case, the installation through hole of the base may not have the wide portion and the narrow portion for forming the contact surface to support the joint.

In the aforementioned paragraphs, the socket 30 is the female joint, and the joint 122 of the cable assembly 120 is the male joint, but the disclosure is not limited thereto; in some other embodiments, the socket may be a male joint, and the joint of the correspondingly cable assembly may be a female joint.

On the other hand, the elastic component is not restricted to being applied on the cable assembly. In some other embodiment, the elastic component may be applied in the socket on the circuit board, which also can prevent the terminal of the joint of the cable assembly and the terminal of the socket from excessively colliding each other and from being damaged.

According to the electrical connector and the cable assembly as discussed above, the elastic component is sleeved on the joint and is clamped between a part of the joint and the inner surface of the installation through hole, such that during the installation of the joint on the socket, even if the central lines of the joint and the socket are not perfectly aligned with each other, the joint can sway in the installation through hole via the elasticity of the elastic component so as to be smoothly assembled with the socket. Therefore, the terminal of the joint and the terminal of the socket can be prevented from excessively colliding each other and from being damaged.

In addition, the fastener is fixed in the wide portion of the installation through hole of the base, and the elastic component is clamped between the radial flange of the sleeve of the joint and the fastener, such that when the joint having overly long length due to manufacturing deviations (errors) is assembled with the socket, the joint can compress the elastic component so as to move along the axial direction of the elastic component. Therefore, the terminal of the joint and the terminal of the socket can be prevented from excessively colliding each other and from being damaged.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electrical connector, comprising:

a base, having a plurality of installation through holes; and a plurality of cable assemblies, each comprising:

a cable;

a joint, connected to one end of the cable and located in one of the plurality of installation through holes; and an elastic component, sleeved on the joint and clamped between a part of the joint and an inner surface of the one of the plurality of installation through holes, wherein the joint is movable in the one of the plurality of installation through holes via an elasticity of the elastic component;

wherein each of the plurality of cable assemblies further comprises a fastener, the fastener is sleeved on the cable, the elastic component is clamped between the fastener and a part of the joint, and the fastener is mounted into the one of the plurality of installation through holes of the base;

wherein the joint has a radial flange, and the elastic component is clamped between the radial flange and the fastener;

wherein each of the plurality of installation through holes has a wide portion and a narrow portion connected to each other, a width of the wide portion is larger than a width of the narrow portion, a contact surface is formed at a place where the wide portion is connected to the narrow portion, the joint extends from the wide portion to the narrow portion, the radial flange is located in the wide portion, and two opposite sides of the radial flange are respectively in contact with the elastic component and the contact surface.

2. The electrical connector according to claim 1, wherein each of the plurality of installation through holes further has a tapered portion, the tapered portion is connected to one side of the narrow portion located farther away from the wide portion, a width of the tapered portion gradually increases along a direction away from the narrow portion, and the joint extends from the wide portion to the tapered portion.

3. The electrical connector according to claim 1, wherein the joint is spaced apart from the inner surface of the one of the plurality of installation through holes in a radial direction of the joint.

4. The electrical connector according to claim 1, wherein the plurality of installation through holes are arranged along a straight line.

5. A cable assembly, configured to be mounted into an installation through hole of a base, comprising:

a cable;

a joint, connected to one end of the cable and configured to be located in the installation through hole of the base; and an elastic component, sleeved on the joint and configured to be clamped between a part of the joint and an inner surface of the installation through hole, wherein the joint is movable in the installation through hole via an elasticity of the elastic component;

wherein the cable assembly further comprises a fastener, the fastener is sleeved on the cable, the elastic component is clamped between the fastener and a part of the joint, and the fastener is configured to be mounted into the installation through hole of the base;

wherein the joint has a radial flange, and the elastic component is clamped between the radial flange and the fastener;

wherein the installation through hole has a wide portion and a narrow portion connected to each other, a width of the wide portion is larger than a width of the narrow portion, a contact surface is formed at a place where the wide portion is connected to the narrow portion, the joint extends from the wide portion to the narrow portion, the radial flange is located in the wide portion, and two opposite sides of the radial flange are respectively in contact with the elastic component and the contact surface.

* * * * *